US009239931B2

(12) United States Patent
Ibel

(10) Patent No.: US 9,239,931 B2
(45) Date of Patent: Jan. 19, 2016

(54) IDENTIFYING SHARED CONTENT STORED BY A SERVICE

(71) Applicant: Google Inc., Mountain View, CA (US)

(72) Inventor: Maximilian Ibel, Palo Alto, CA (US)

(73) Assignee: Google Inc., Mountain View, CA (US)

(*) Notice: Subject to any disclaimer, the term of this patent is extended or adjusted under 35 U.S.C. 154(b) by 370 days.

(21) Appl. No.: 13/656,552

(22) Filed: Oct. 19, 2012

(65) Prior Publication Data

US 2014/0115054 A1  Apr. 24, 2014

(51) Int. Cl.
G06F 15/16 (2006.01)
G06F 21/62 (2013.01)
H04L 29/06 (2006.01)
H04W 8/22 (2009.01)

(52) U.S. Cl.
CPC ............ G06F 21/62 (2013.01); H04L 63/101 (2013.01); H04W 8/22 (2013.01)

(58) Field of Classification Search
CPC ....... G06F 15/16; G06F 21/62; H04L 63/101; H04W 8/22
USPC ........................................................ 709/204
See application file for complete search history.

(56) References Cited

U.S. PATENT DOCUMENTS

| 7,302,435 | B2* | 11/2007 | Kohut et al. ........................ 1/1 |
| 7,769,742 | B1 | 8/2010 | Brawer et al. |
| 7,801,881 | B1 | 9/2010 | Brawer et al. |
| 7,865,497 | B1 | 1/2011 | Pillai |
| 2007/0079236 | A1* | 4/2007 | Schrier et al. ................... 715/517 |
| 2007/0233647 | A1* | 10/2007 | Rawat et al. ........................ 707/3 |
| 2008/0027909 | A1* | 1/2008 | Gang et al. .......................... 707/3 |
| 2010/0268596 | A1 | 10/2010 | Wissner et al. |
| 2012/0197980 | A1 | 8/2012 | Terleski et al. |
| 2013/0091214 | A1* | 4/2013 | Kellerman et al. ............ 709/204 |
| 2013/0210397 | A1* | 8/2013 | Nakajima ................... 455/414.1 |

FOREIGN PATENT DOCUMENTS

WO  2012/056783  5/2012

OTHER PUBLICATIONS

"Create you Google Sitemap Online—XML Sitemaps Generator," <http://www.xml-sitemaps.com>, retrieved Jan. 24, 2013.
International Search Report and Written Opinion in International Application No. PCT/US2013/65392, mailed Dec. 4, 2014, 8 pages.
International Preliminary Report on Patentability in International Application No. PCT/US2013/65392, mailed Apr. 30, 2015, 7 pages.

* cited by examiner

Primary Examiner — Yves Dalencourt
(74) Attorney, Agent, or Firm — Fish & Richardson P.C.

(57) ABSTRACT

Various aspects of the subject technology relate to systems, methods, and machine-readable media for providing an updated list of public content items to a search engine. A system is configured to determine whether a sharing property of a content item stored by a first service has been altered, wherein the sharing property indicates whether the content item is available to a different set of users, update a list of content items if the sharing property has been altered, and provide the updated list of content items to a second service.

20 Claims, 7 Drawing Sheets

| Element | Description |
|---|---|
| <Location> | Provides the location (e.g., URL) of the content item, including the protocol (e.g. http, https) needed to access the content item |
| <Last Modified> | The date that the content item was last modified |
| <Change Frequency> | How frequently the content may change |
| <Priority> | The priority of the content item relative to other content items. |

IDENTIFYING SHARED CONTENT STORED BY A SERVICE

BACKGROUND

The present disclosure generally relates to sharing content between devices. Many cloud-based services, such as social networking sites, file storage sites, or content sharing sites, allow users to create a content item and store the content item on a server. Some cloud-based services also allow users to share the content item with specific users, groups of users, or even with the general public. A user may share a content item stored by a cloud-based service by, for example, obtaining a uniform resource locator (URL) for the content item and sharing the URL with other users. The other users may then use the URL for the content item to access (e.g., download) the content item from the cloud-based service.

SUMMARY

Various aspects of the subject technology relate to a system for providing an updated list of shared content items. The system may include one or more processors and a machine-readable medium comprising instructions stored therein, which when executed by the one or more processors, cause the one or more processors to perform operations. The operations may include determining whether a sharing property in an access control list (ACL) associated with a content item stored by a first service has been changed to allow sharing of the content item with the different set of users, creating an entry corresponding to the content item if the sharing property has been changed to allow the sharing of the content item with the different set of users, inserting the entry into the list of content items, and providing the updated list of content items to a second service. The different set of users allowed to access content items in the updated list of content items via the second service may be allowed to access content items stored on the first service.

These and other aspects can include one or more of the following features. The operations may further include determining whether the sharing property of the content item has been changed to prohibit the sharing with the different set of users and, if the sharing property of the content item has been changed to prohibit the sharing with the different set of users, removing the entry corresponding to the content item from the list of content items if the sharing property of the content item has been changed to prohibit the sharing with the different set of users.

According to some aspects, the providing of the updated list of content items to the second service may include submitting the list of content items to the second service via a network or publishing the list of public content items on a website. According to some aspects, updated list of public content items is a sitemap file. According to some aspects, the system and the cloud-based service share at least one of the one or more processors.

Other aspects of the subject technology relate to a method for providing an updated list of shared content items. The method may include determining whether a sharing property of a content item stored by a first service has been altered to allow sharing of the content item with a different set of users, updating a list of content items if the sharing property has been altered to allow the sharing of the content item with the different set of users, and providing the updated list of content items to a second service. The different set of users allowed to access content items in the updated list of content items via the second service may be allowed to access content items stored on the first service. The updating of the list of public content items may include creating an entry corresponding to the content item and inserting the entry into the list of public content items.

These and other aspects can include one or more of the following features. According to some aspects, the method may include determining whether the sharing property has been altered to prohibit sharing with the different set of users and updating the list of content items if the sharing property has been altered to prohibit the sharing of the content item with the different set of users, wherein the updating of the list of content items comprises removing an entry corresponding to the content item from the list of content items.

According to some aspects, the providing of the updated list of content items to the second service includes submitting the list of public content items to the search engine via a network. According to other aspects, the providing of the updated list of content items to the second service includes publishing the list of public content items on a website.

According to some aspects, the providing of the updated list of content items to the second service occurs periodically. According to other aspects, the method further includes, if the sharing property has been altered, incrementing a number of updates and determining whether the number of updates has exceeded a threshold number of updates, wherein the providing of the updated list of content items to the second service occurs if the number of updates exceeds the threshold number of updates.

According to some aspects, the determining that the sharing property of the content item has been altered comprises determining that an access control list (ACL) associated with the content item has been altered, wherein the ACL specifies a number of sharing properties for the content item.

According to some aspects, the updated list of content items is a sitemap or an Extensible Markup Language (XML) file. According to some aspects, the first service includes at least one of a cloud-based content sharing services or a social networking service, the second service includes a search engine, and the different set of users is the general public.

Various aspects of the subject technology relate to a non-transitory machine-readable medium comprising instructions stored therein, which when executed by a machine, cause the machine to perform operations for providing an updated list of shared content items. The operations may include determining whether a sharing property of a content item stored by a first service has been altered to allow sharing of the content item with the different set of users, updating a list of content items if the sharing property has been altered, and providing the updated list of content items to a second service, wherein the different set of users allowed to access content items in the updated list of content items via the second service are allowed to access content items stored on the first service.

These and other aspects can include one or more of the following features. If the sharing property of the content item has been altered to allow sharing with the different set of users, the updating the list of content items may include creating an entry corresponding to the content item and inserting the entry into the list of content items.

According to some aspects, the operations further include determining whether the sharing property of the content item stored by a first service has been altered to prohibit the sharing of the content item with the different set of users and if the sharing property of the content item has been altered to prohibit sharing with the different set of users, the updating of the list of content items includes removing an entry corresponding to the content item from the list of content items.

According to some aspects, the first service is a cloud-based content storage service configured to store content including at least one of documents, spreadsheets, drawings, presentations, photos, social media updates, electronic mails, or mailing lists.

These and other aspects may provide one or more of the following advantages. Various aspects of the subject technology relate to generating a list of public content items a cloud-based service and providing list of public content items to a search engine. Using the list of the public content item, the search engine may be able to quickly locate the public content item on the cloud-based service, index it, and make it available for searching. Some aspects also are able to quickly identify content items that are no longer public and make them unavailable for searching by the public.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding of the subject technology and are incorporated in and constitute a part of this specification, illustrate disclosed aspects of the subject technology and together with the description serve to explain the principles of the subject technology.

FIG. 3 is a block diagram illustrating an example definition of an entry for a list of public content items, in accordance with various aspects of the subject technology.

DETAILED DESCRIPTION

Figure 1:
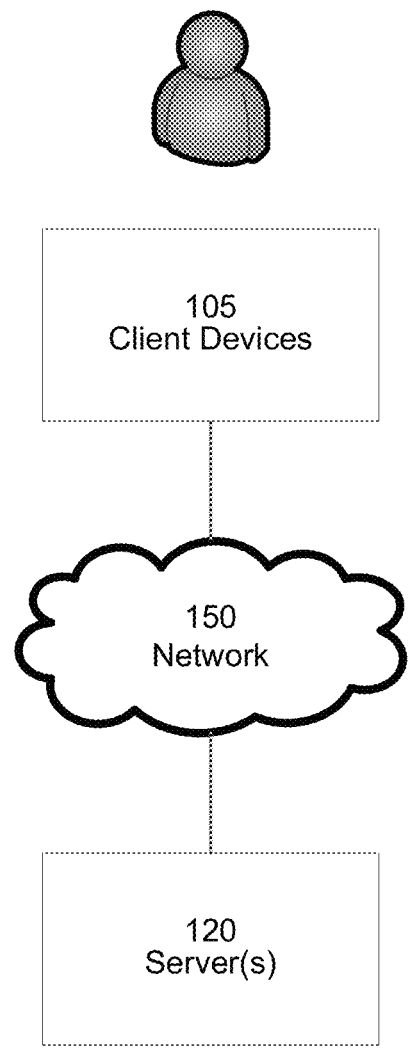
FIG. 1 is a block diagram illustrating an example network environment in which a system for detecting sharing properties of a content item located on a cloud-based service may exist, in accordance with various aspects of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent that the subject technology may be practiced without these specific details.

A content item may include any unit of data (e.g., a file) that may be stored on a computing system. Cloud-based services may be configured to store content items for users and, in some cases, share the content items with other computing systems or users. Some example content items may include, for example documents (e.g., word processing documents, portable document format (PDF) documents, power point presentations, spreadsheets), images or photos, drawings, presentations, mails or mailing lists, social media updates, tweets, profiles, audio files, application files, or any other sharable unit of data.

It may be difficult to share a content item located on a cloud-based service with the general public unless a user has knowledge of its existence and location. For example, a content owner may share a content item by requesting a reference (e.g., a uniform resource identifier (URI) or other link) to the content item from the cloud-based service and sharing the reference with others. The content owner may share the reference by, for example, sending an email or other message (e.g., a text message, an online chat message) with the reference to one or more recipients, by creating a post on a social networking site, or by publishing the reference in other content (e.g., a website or traditional print media). Other users wishing to access the content item must receive the reference and use the reference to locate the content item.

In some cases, search engines may have web crawlers that are configured to "crawl" the web to locate and index the content item. However, a web crawler may not be able to locate a public content item that stored on a cloud-based service unless the web crawler has come across a reference to the public content item in one of the web pages the web crawler has crawled. If the reference (e.g., the URI or location) to the public content item has not been published on another website, the web crawler may not ever discover the public content item.

Furthermore, even if the reference to the public content item is published on a website, it may take a long time before the web crawler comes across the website, becomes aware of the public content item, and indexes the public content item such that it is available to users of the search engine. Additionally, if the owner of the content item changes the sharing properties of the content item from public to private (e.g., the owner no longer wishes to share the content item with the general public) on the cloud-based service, it may take some time for the web crawler to discover that the content item is no longer available and delist the content item in the search engine.

Various aspects of the subject technology relate to identifying a reference to a content item stored by a first service (e.g., cloud-based service) and providing the reference to a second service (e.g., search engine). Using the reference to the content item, the second service may be able to quickly locate the content item stored by the first service and, for example, index the content item and make it available for searching.

In some aspects, a content item stored by the first service may be associated with sharing properties that indicate which entities (e.g., particular users, groups of users, the general public, etc.) the service is authorized to share the content item with. The sharing properties for the content item may be found, for example, in an access control list (ACL) associated with the content item.

A system may be configured to access the ACLs for all content items stored by the first service and identify which content items are able to be shared with different sets of users (e.g., the general public, groups of users, or individual users). The system may generate a list of the content items and transmit the list to one or more other services so that the content items may be made available to the different users of the other services (e.g., users a search engine). The list of content items may be in various forms, such as an XML file, a sitemap file, or any other file type that may be posted on a website or transmitted to other services (e.g., pinging or directly submitting a sitemap to the other services).

FIG. 1 is a block diagram illustrating an example network environment 100 in which a system for detecting sharing properties of a content item located on a cloud-based service may exist, in accordance with various aspects of the subject technology. Although FIG. 1 illustrates a client-server network environment 100, other aspects of the subject technology may include other configurations including, for example, peer-to-peer environments.

The network environment may include a client device 105 connected to one or more servers 120 via a network 150 such as the Internet. The client device 105 may be any machine or computing device capable of communicating with the other devices, systems, or servers. Possible client devices 105 may include, for example, mobile devices (e.g., tablet computers, smart phones, or personal digital assistants), laptops, desktop computers, or any other computing devices (e.g., smart-displays, global positioning system devices, etc.).

The one or more servers 120 may each be a computing system having a processor, a memory, and communications capabilities. Furthermore, multiple servers 120 may be at the same location or at different locations and communicate with one another through the network 150 or a different network.

The one or more servers 120 may host various systems configured to provide services to the client device 105. For example, a server or a cluster of servers may host a search engine configured to receive search queries from a user of the client device 105, identify a set of search results, and provide the search results to the user.

The servers 120 or clusters of servers may also host various cloud-based services configured to store documents, audio files, images, or other content items. Users may use the client device 105 to upload the content items, access the content items, edit the content items, or share the content items with others. Example cloud-based services may include cloud storage services, content sharing services (e.g., file sharing or photo sharing websites), social networking services, or any other services where digital content may be uploaded to a server and shared with others.

According to various aspects of the subject technology, the one of the servers 120 or a cluster of servers may also host a system configured to identified content items stored on one or more cloud-based services that are shared with the public and provide references to the content items to one or more search engines. One such system is described below with respect to FIG. 2. The one or more search engines may use the references to the content items to locate the content items, index them, and make them available for searching by users.

Figure 2:
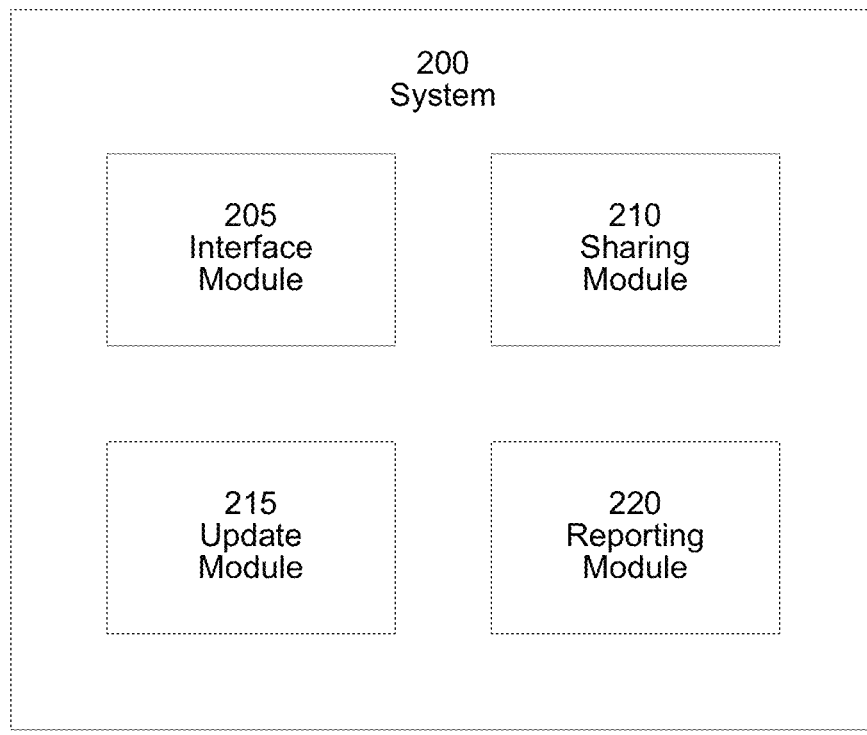
FIG. 2 is a block diagram illustrating an example system configured to determine the sharing properties of content items stored on one or more cloud-based services, in accordance with various aspects of the subject technology.

FIG. 2 is a block diagram illustrating an example system 200 configured to determine the sharing properties of content items stored on one or more cloud-based services, in accordance with various aspects of the subject technology. The system 200 may include an interface module 205, a sharing module 210, an update module 215, and a reporting module 220. In other aspects, however, the system 200 may include additional modules, fewer modules, or different modules.

The interface module 205 is configured to contact a cloud-based service and access information about content items stored on the cloud-based service. For example, the interface module 205 may access references to content items stored by the cloud-based service and the sharing properties for those content items. The sharing properties for each content item may be accessed from, for example, an access control list (ACL) associated with the content item that indicates which entities (e.g., particular users, groups of users, the general public, etc.) are authorized to perform a particular control action (e.g., access, create, view, edit, delete, etc.).

The sharing module 210 may determine, based on the sharing properties of the content items, content items that are available to the public (e.g., the general public is allowed to perform at least one control action such as access the content item) and generate a list of content items available to the public. The list of public content items may be in various forms, such as an XML file, a sitemap or site index file, or any other data type.

According to some aspects, each public content item may have an associated entry in the list of public content items that includes information about the public content item that may be helpful to a search engine. For example, FIG. 3 is a block diagram illustrating an example definition 300 of an entry for a list of public content items, in accordance with various aspects of the subject technology. Each entry in the list of public content items may include, for example, the location of the content item (e.g., a reference or URI for the content item) as well as an indication of the protocol needed to access the content item, the last date and time the content item was modified (which may include modifications to its sharing properties), an indication of how frequently the content item is changed or updated, and a priority value that indicates how important the content item is relative to other content items on stored by the cloud-based service.

The reporting module 220 may be configured to provide the list of public content items to one or more search engines. According to some aspects, providing the list of public content items may include posting the list of public content items or a file (e.g., a sitemap file) that includes the list on a website. In other aspects, providing the list to search engines includes transmitting the file to a search engine (e.g., pinging or directly submitting a sitemap file to a search engine) either on its own accord or in response to a request from the search engine.

According to various aspects of the subject technology, the system 200 may also be configured to detect updates to the sharing properties of public content items stored on the cloud-based service and inform a search engine whether a private content item has become public or whether a public content item has become private. For example, when a user changes the sharing properties of the content item, the ACL for the content item may be updated.

The update module 215 may be configured to detect the updates to the ACLs associated with the content items stored on the cloud-based service and determine whether the each update is to make an associated content item public or to make the associated content item private. Based on the determination, the reporting module 220 may update the list of public content items (e.g., an Extensible Markup Language (XML) file or sitemap file) and provide the updated list of public content items to the search engine. In other aspects, instead of providing the updated list, the reporting module 220 may provide the search engine with updates to the list of public content items (e.g., the changes to the previously provided list of public content items).

According to some aspects, the updated list of public content items may be provided to the search engine when an update to a ACL occurs that effects the existing list of public content items. According to other aspects, the updated list may be provided when a certain number of updates to ACLs of content items have occurred (e.g., 1000 updates to ACLs of content items on the cloud-based server), periodically (e.g., every hour), or a combination of schemes.

Figure 4A:
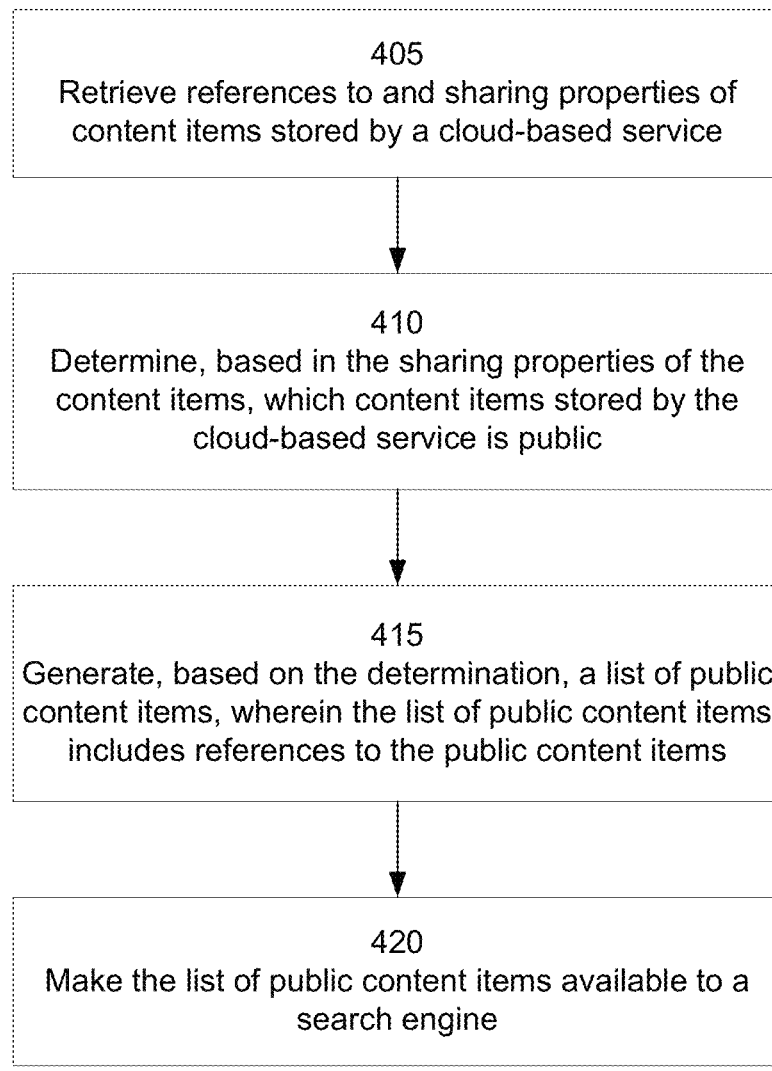
FIG. 4A is a flow chart illustrating an example process for creating a list of public content items, in accordance with various aspects of the subject technology.

FIG. 4A is a flow chart illustrating an example process 400 for creating a list of public content items, in accordance with various aspects of the subject technology. Although the steps in process 400 are shown in a particular order, certain steps may be performed in different orders or at the same time. In addition, although the process steps of FIG. 4A are described with reference to the components of the system 200 in FIG. 2, the steps are not limited to being performed these components.

At step 405, the interface module 205 may contact one or more servers that host a cloud-based service and retrieve references (e.g., a location or a URI) to content items stored by the cloud-based service as well as the sharing properties of those content items. The interface module 205 may contact the one or more servers over a network (e.g., the Internet or a local area network) or, in some aspects, the interface module 205 may be hosted by the same one or more servers as the cloud-based service and the interface module 205 may retrieve the information without the use of the network.

Based on the sharing properties of the content items, the sharing module 210 may determine which content items stored on the cloud-based service are public at step 410 and, at step 415, generate a list of public content items based on the determination. The list of public content items may contain an entry for each public content item that includes the reference that may be used to access the public content item. As discussed above, the list of public content items may be in the form of a sitemap, an XML file, or any other data structure or file type that may be used by a search engine.

At step 420, the reporting module 220 may make the list of public content items available to a search engine by, for example, publishing the list of public content items on a website that is accessible to a search engine, by transmitting the list of public content items directly to the search engines, or by providing the list of public content items to the search engine when requested.

Over time, however, the list of public content items may become out-of-date as content owners change the sharing properties or access controls of content items or new content items are uploaded to the cloud-based service. Accordingly, the system 200 may also be configured to detect new content items and/or changes to sharing properties of content items and update the list of public content items. The updated list (or updates to the list) may then be provided to one or more search engines.

Figure 4B:
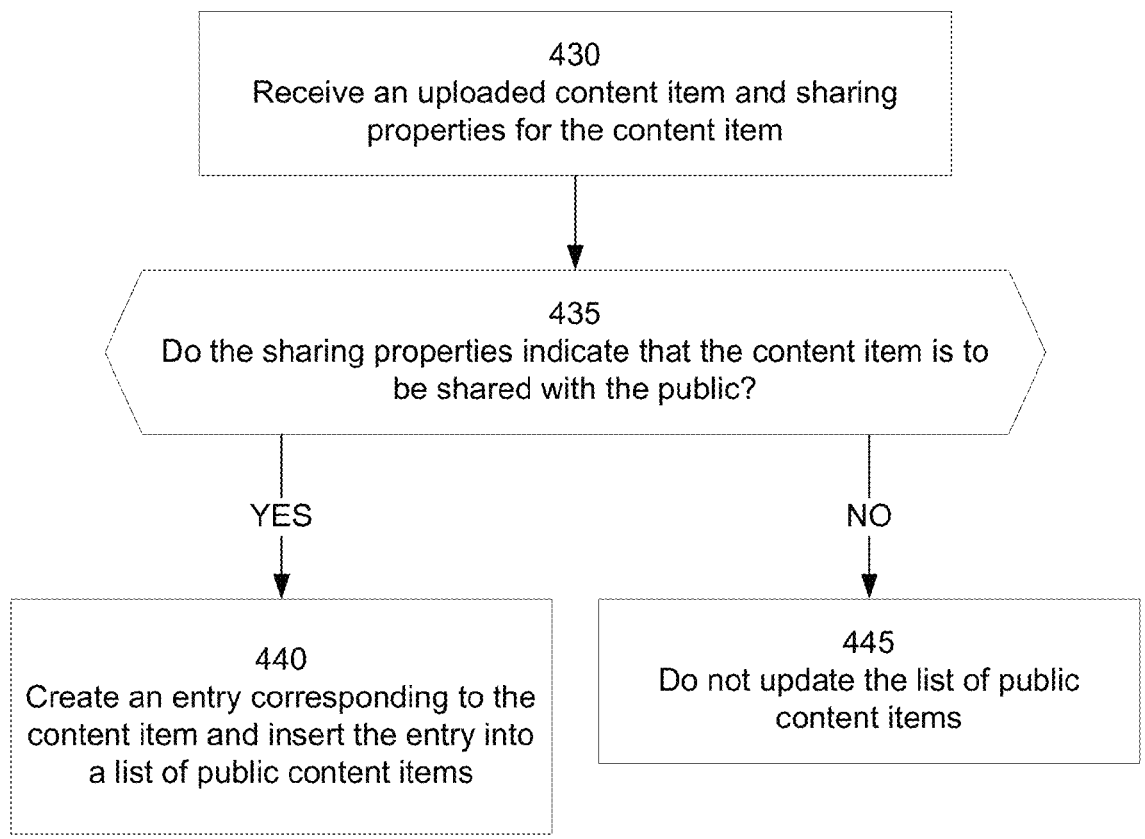
FIG. 4B is a flow chart illustrating an example process for detecting the sharing properties of a newly uploaded content item on a cloud-based service, in accordance with various aspects of the subject technology.

FIG. 4B is a flow chart illustrating an example process 425 for detecting the sharing properties of a newly uploaded content item on a cloud-based service, in accordance with various aspects of the subject technology. Although the steps in process 425 are shown in a particular order, certain steps may be performed in different orders or at the same time. In addition, although the process steps of FIG. 4B are described with reference to the components of the system 200 in FIG. 2, the steps are not limited to being performed these components.

The system 200 may maintain a list of public content items stored by a cloud-based service. When a user uploads a new content item to the cloud-based service, the system 200 may detect the newly uploaded content item and update the list of public content items if the newly uploaded content item is to be shared with the general public. A cloud-based service, for example, may notify the system 200 when a new content item has been uploaded. At step 430, the interface module 205 may receive the uploaded content item itself or a reference to the content item along with sharing properties (e.g., an ACL) for the content item.

The system 200 may determine whether the sharing properties for the content item indicate that the content item is to be shared with the public at step 435. If the sharing properties indicate that the content item is to be shared with the public, at step 440, the update module 215 may create an entry corresponding to the newly uploaded content item and insert the entry into the list of public content items. If the sharing properties do not indicate that the content item is to be shared with the public, the update module 215 will not update the list of public content items (see step 445 in FIG. 4B).

In some cases, the content item and/or the sharing properties for the content item may be altered after the content item has been uploaded to the cloud-based service by, for example, a user, a content owner, or system administrator. In such cases, the system 200 may detect the change to the content item and determine if an update to the list of public content items should be made in order to keep the list of public content items up-to-date.

Figure 4C:
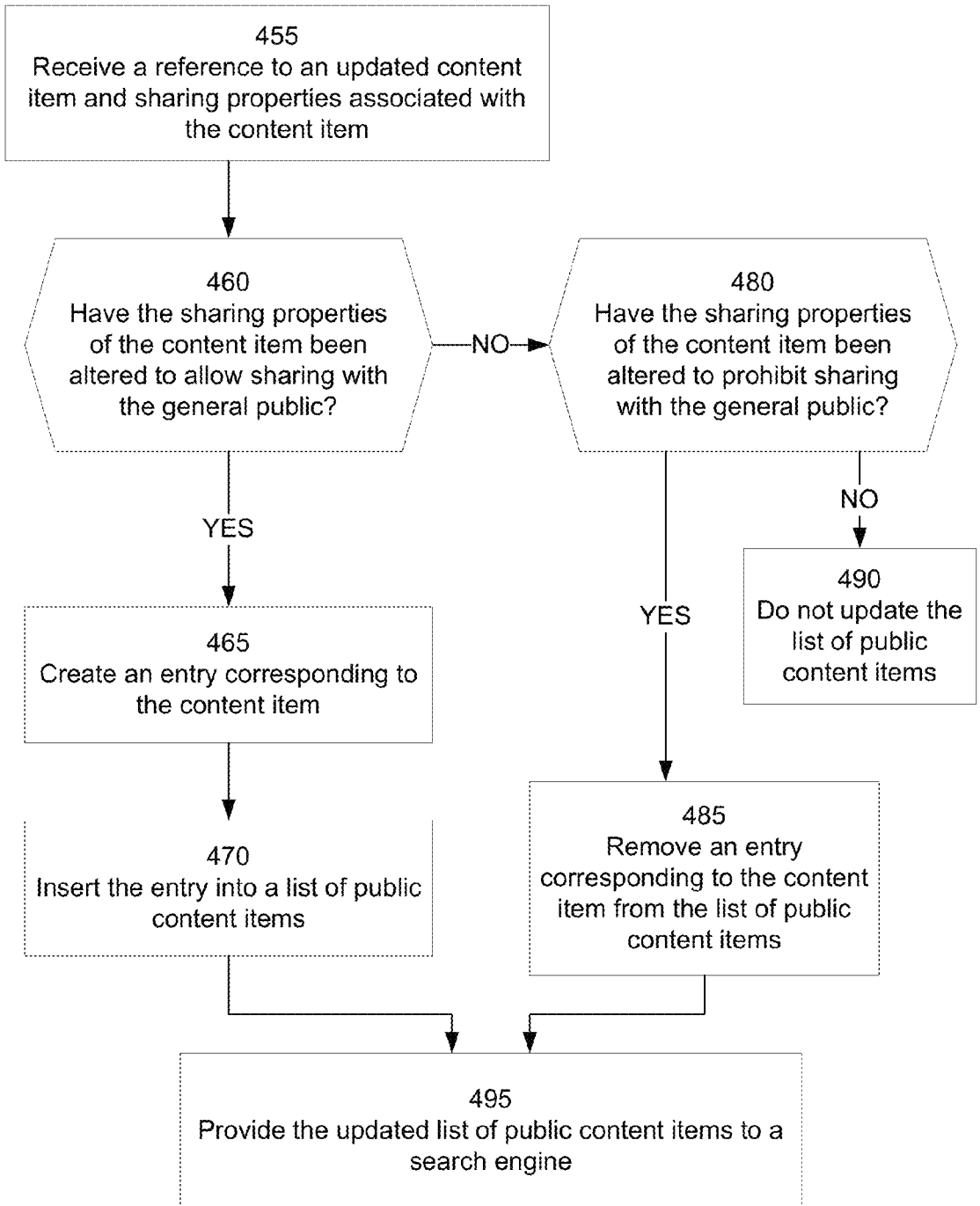
FIG. 4C is a flow chart illustrating an example process for detecting changes to a content item and providing an updated list of public content items, in accordance with various aspects of the subject technology.

FIG. 4C is a flow chart illustrating an example process 450 for detecting changes to a content item and providing an updated list of public content items, in accordance with various aspects of the subject technology. Although the steps in process 450 are shown in a particular order, certain steps may be performed in different orders or at the same time. In addition, although the process steps of FIG. 4C are described with reference to the components of the system 200 in FIG. 2, the steps are not limited to being performed these components.

In addition to detecting newly uploaded content items, the system 200 may detect the changes to the sharing properties of the content items stored by the cloud-based service when the sharing properties are altered by the content owner or some other party (e.g., a system administrator). According to some aspects, for example, one or more could-based services may provide the system 200 with a feed of references to content items that have had their sharing properties altered as well as access to access control lists (ACLs) for those content items.

At step 455, the interface module 205 may receive a reference to a content item that has been altered or has had its sharing properties altered. In response to receiving the reference to the content item, the update module 215 may determine, at step 460, whether the sharing properties of the content item have been altered to allow sharing of the content item with the general public. If one or more of the sharing properties have been altered to allow sharing with the general public, the update module 215 may update the list of public content items. For example, at step 465, if the ACL for the content item indicates that the content item is available to the public, the update module 215 may create an entry for the content item at step 465 and add the entry into the list of public content item at step 470, if one does not already exist. If an entry for the content item is already in the list of public content items, the update module 215 may update the entry (e.g., update the "Last Modified" element in the entry, see the example entry definition 300 in FIG. 3).

If the sharing properties were not altered to allow for the sharing of the content item with the general public, at step 480, the update module 215 may also determine whether the sharing properties of the content item have been altered to prohibit the sharing of the content item with the general public based on the ACL for the content item. If the ACL for the content item indicates that the content item is private or not available to the public, the update module 215, at step 485, may remove an entry for the content item from the list of public content items, if the entry exists. If the sharing properties where not altered to prohibit the sharing of the content item with the general public, the update module 215 does not need to update the list of public content items to keep the list of public content items up-to-date (see step 490 of FIG. 4C).

After the list is updated, the reporting module 220 may provide the updated list of public content items to a search engine at step 495. For example the reporting module 220 may submit the list of public content items to the search engine or publishing the list of public content items as a sitemap on a website. According to one aspect of the subject technology, the location of the sitemap may be included in a robots.txt file in the root of a web site hierarchy (e.g., www.example.com/robots.txt).

When the search engine receives the updated list of public content items, the search engine may index newly public content items and remove the availability newly non-public content items for searches. By being provided with an updated list of public content items, the search engine may be able to more quickly determine which content items stored by the cloud-based service are available for indexing and which content items are no longer public. Accordingly, the search engines may be able to have newly public content items available for searching and not include content items that are no longer public in search results.

As discussed above, the update module 215 may receive a feed of references to content items and access control lists (ACLS) that correspond to content items that have had their sharing properties altered. According to other aspects however, the feed may correspond to content items that have been altered in general, which may include changes to the content item itself, to the sharing properties of the content items, or to any other information about the content items.

According to some aspects of the subject technology, content items may be organized on the cloud-based service in a hierarchy. Accordingly, if a content owner or administrator changes the sharing properties for a content item, in some aspects, sharing properties for child content items that descend from the content item may also be changed in the same way.

Although some aspects refer to a list of content items being updated in response to sharing properties of content items being altered to allow or prohibit sharing with the general public, in other aspects, however, the list of content items may be updated in response to sharing properties of content items may be altered in any other way. For example, the sharing properties in an access control list (ACL) of a content item may be altered to allow one set of users to access the content item, to prohibit another set of users to access the content item, a combination of these, or any other change in the ACL of the content item. In response the changes in the ACL, the list of content items may be updated.

Although some aspects refer to search engines or cloud-based content storage services, any other types of services may also be used. Furthermore, according to some aspects, the updated list of content items may be used by a second service to provide a users of the second service with access to content items stored by the first service. However, the users of the second service are only be allowed access to the content items if the users would be allowed by the first service to access the content items. Accordingly, the second service will not grant users access to content items if the users do not already have authorization from the first service to access the content items.

Figure 5:
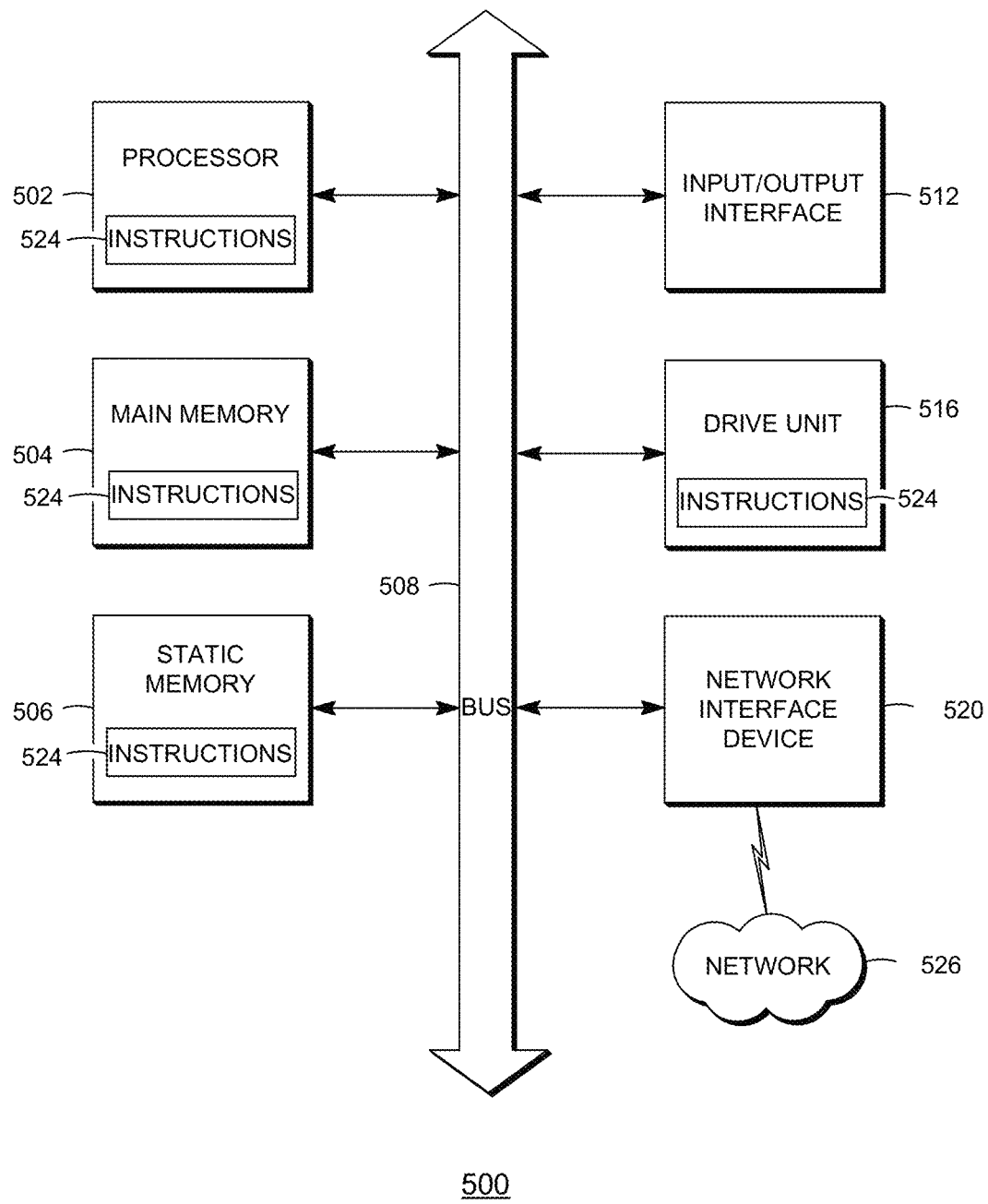
FIG. 5 is a block diagram illustrating an example computer system with which any of the devices, servers, or systems discussed herein may be implemented, in accordance with one aspect of the subject technology.

FIG. 5 is a block diagram illustrating an example computer system 500 with which any of the devices, servers, or systems discussed herein may be implemented, in accordance with one aspect of the subject technology. In certain aspects, the computer system 500 may be implemented using hardware or a combination of software and hardware, either in a dedicated server, or integrated into another entity, or distributed across multiple entities.

The example computer system 500 includes a processor 502, a main memory 504. a static memory 506, a disk drive unit 516, and a network interface device 520 which communicate with each other via a bus 508. The computer system 500 may further include an input/output interface 512 that may be configured to communicate with various input/output devices such as video display units (e.g., liquid crystal (LCD) displays, cathode ray tubes (CRTs), or touch screens), an alphanumeric input device (e.g., a keyboard), a cursor control device (e.g., a mouse), or a signal generation device (e.g., a speaker).

Processor 502 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

A machine-readable medium (also referred to as a computer-readable medium) may store one or more sets of instructions 524 embodying any one or more of the methodologies or functions described herein. The instructions 524 may also reside, completely or at least partially, within the main memory 504 and/or within the processor 502 during execution thereof by the computer system 500, with the main memory 504 and the processor 502 also constituting machine-readable media. The instructions 524 may further be transmitted or received over a network 526 via the network interface device 520.

The machine-readable medium may be a single medium or multiple media (e.g., a centralized or distributed database, and/or associated caches and servers) that store the one or more sets of instructions. The machine-readable medium may include the drive unit 516, the static memory 506, the main memory 504, the processor 502, an external memory connected to the input/output interface 512, or some other memory. The term "machine-readable medium" shall also be taken to include any non-transitory medium that is capable of storing, encoding or carrying a set of instructions for execution by the machine and that cause the machine to perform any one or more of the methodologies of the embodiments discussed herein. The term "machine-readable medium" shall accordingly be taken to include, but not be limited to, storage mediums such as solid-state memories, optical media, and magnetic media.

The various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method executed by one or more processors, the method comprising:
    storing, by the one or more processors, a content item in computer-readable memory, the content item being distributable to one or more users by a first service and having a sharing property associated therewith, the sharing property indicating a first set of users, to which the content item is to be distributed;
    transmitting, by the one or more processors, the content item to the first service to be made available to the first set of users, and
    determining, after the content item has been transmitted to the first service, that the sharing property of the content item has been altered to allow distribution of the content item with a second set of users, the second set of users comprising more users than the first set of users, and in response:
        updating a first list of content items to allow the distribution of the content item to the second set of users, wherein the updating of the first list of content items comprises:
            creating an entry corresponding to the content item, and
            inserting the entry into the first list of content items to provide a second list of content items; and
        providing the second list of content items to a second service, wherein the second set of users are allowed to access content items in the second list of content items using the second service including the content item of the first service.

2. The method of claim 1, further comprising:
    determining that the sharing property has been altered to prohibit sharing with the second set of users, and in response:
        updating the second list of content items by removing the entry corresponding to the content item from the second list of content items.

3. The method of claim 1, wherein providing the second list of content items to the second service comprises submitting the second list of content items to the second service via a network.

4. The method of claim 1, wherein providing the second list of content items to the second service comprises publishing the updated list of content items on a website.

5. The method of claim 1, further wherein providing the second list of content items to the second service occurs periodically.

6. The method of claim 1, further comprising, if the sharing property has been altered:
    incrementing a number of updates; and
    determining whether the number of updates has exceeded a threshold number of updates; and
    wherein providing the second list of content items to the second service occurs if the number of updates exceeds the threshold number of updates.

7. The method of claim 1, wherein determining that the sharing property of the content item has been altered comprises determining that an access control list (ACL) associated with the content item has been altered, wherein the ACL specifies a number of sharing properties for the content item.

8. The method of claim 1, wherein the second list of content items comprises a sitemap file.

9. The method of claim 1, wherein the second list of content items comprises an Extensible Markup Language (XML) file.

10. The method of claim 1, wherein the first service comprises at least one of a cloud-based content sharing services or a social networking service, wherein the second service comprises a search engine, and wherein the second set of users comprises the general public.

11. A system comprising:
    one or more processors; and
    a machine-readable medium comprising instructions stored therein, which when executed by the one or more processors, cause the one or more processors to perform operations comprising:
        storing a content item in computer-readable memory, the content item being distributable to one or more users by a first service and having a sharing property associated therewith, the sharing property indicating a first set of users, to which the content item is to be distributed; and
        transmitting, by the one or more processors, the content item to the first service to be made available to the first set of users, and determining, after the content item has been transmitted to the first service, that the sharing property in a first access control list (ACL) associated with the content item has been changed to allow distribution of the content item with a second set of users, the second set of users comprising more users than the first set of users, and in response:
    creating an entry corresponding to the content item,
    inserting the entry into the list of content items to provide a second list of content items and
    providing the second list of content items to a second service, wherein the second set of users allowed to access content items in the second list of content items using the second service including the content item of the first service.

12. The system of claim 11, wherein the operations further include:
    determining that the sharing property of the content item has been changed to prohibit the sharing with the second set of users, and in response:
    removing the entry corresponding to the content item from the second list of content items.

13. The system of claim 11, wherein providing the second list of content items to the second service comprises submitting the second list of content items to the second service via a network.

14. The system of claim 11, wherein providing the second list of content items to the second service comprises publishing the second list of content items on a website.

15. The system of claim 11, wherein the second list of content items comprises a sitemap file.

16. The system of claim 11, wherein the system and the first service share at least one of the one or more processors.

17. A non-transitory machine-readable medium comprising instructions stored therein, which when executed by a machine, cause the machine to perform operations comprising:
    storing a content item in computer-readable memory, the content item being distributable to one or more users by a first service and having a sharing property associated therewith, the sharing property indicating a first set of users, to which the content item is to be distributed; and
    transmitting, by the one or more processors, the content item to the first service to be made available to the first set of users, and
    determining, after the content item has been transmitted to the first service, that the sharing property of the content item has been altered to allow distribution of the content item with a second set of users, the second set of users comprising more users than the first set of users, and in response:
        updating a first list of content items to provide a second list of content items and
        providing the second list of content items to a second service, wherein the second set of users allowed to access content items in the second list of content items using the second service including the content item of the first service.

18. The non-transitory machine-readable medium of claim 17, wherein the updating the first list of content items comprises:
    creating an entry corresponding to the content item, and
    inserting the entry into the first list of content items.

19. The non-transitory machine-readable medium of claim 17, wherein the operations further comprise:
    determining that the sharing property of the content item has been altered to prohibit the sharing of the content item with the second set of users, and in response:
    updating of the second list of content items by removing an entry corresponding to the content item from the second list of content items.

20. The non-transitory machine-readable medium of claim 17, wherein the first service comprises a cloud-based content storage service configured to store content comprising at least one of documents, spreadsheets, drawings, presentations, photos, social media updates, electronic mails, or mailing lists.

* * * * *